US006850991B1

(12) United States Patent
Young et al.

(10) Patent No.: US 6,850,991 B1
(45) Date of Patent: Feb. 1, 2005

(54) SYSTEMS AND METHODS FOR DISTRIBUTING INFORMATION TO A DIVERSE PLURALITY OF DEVICES

(75) Inventors: Alan Young, New Canaan, CT (US); Peter Tompkins, Malibu, CA (US); Michael Grandcolas, Santa Monica, CA (US)

(73) Assignees: Citibank, N.A., New York, NY (US); Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/468,945

(22) Filed: Dec. 22, 1999

Related U.S. Application Data

(60) Provisional application No. 60/113,632, filed on Dec. 22, 1998.

(51) Int. Cl.[7] ............................................. G06F 15/16
(52) U.S. Cl. ..................................... 709/246; 709/230
(58) Field of Search ................................ 709/246, 230, 709/200–203, 250; 713/201

(56) References Cited

U.S. PATENT DOCUMENTS

| | | | |
|---|---|---|---|
| 4,942,534 A | 7/1990 | Yokoyama et al. ......... 364/468 |
| 5,189,632 A | 2/1993 | Paajanen et al. ....... 364/705.05 |
| 5,220,501 A | 6/1993 | Lawlor et al. .............. 364/408 |
| 5,263,875 A | 11/1993 | Spicer et al. ............... 439/367 |
| 5,286,955 A | 2/1994 | Klosa .......................... 235/380 |
| 5,327,529 A | 7/1994 | Fults et al. .................. 395/155 |
| 5,339,239 A | 8/1994 | Manabe et al. ............. 364/401 |
| 5,353,334 A | 10/1994 | O'Sullivan ................... 379/59 |
| 5,396,650 A | 3/1995 | Terauchi .................... 455/38.2 |
| 5,421,030 A | 5/1995 | Baran .......................... 455/5.1 |
| 5,422,473 A | 6/1995 | Kamata ....................... 235/384 |
| 5,425,027 A | 6/1995 | Baran ........................ 370/69.1 |
| 5,485,370 A | 1/1996 | Moss et al. ................. 364/408 |
| 5,485,504 A | 1/1996 | Ohnsorge ..................... 379/58 |
| 5,530,235 A | 6/1996 | Stefik et al. ................ 235/492 |
| 5,566,327 A | 10/1996 | Sehr ........................... 395/600 |
| 5,572,572 A | 11/1996 | Kawan et al. ................ 379/98 |
| 5,577,102 A | 11/1996 | Koivunen ..................... 379/59 |
| 5,583,539 A | 12/1996 | Hiketa et al. ............... 345/146 |
| 5,586,121 A | 12/1996 | Moura et al. ............... 370/404 |
| 5,590,038 A | 12/1996 | Pitroda ....................... 395/241 |

(List continued on next page.)

FOREIGN PATENT DOCUMENTS

| | | | |
|---|---|---|---|
| GB | 2330429 | 4/1999 | ............. G06F/7/30 |
| WO | WO 98/35469 | 8/1998 | |
| WO | WO98/29828 | 9/1998 | .......... G06K/19/00 |

OTHER PUBLICATIONS

Zenel et al., A general purpose proxy filtering mechanism applied to the mobile environment, 1997, MOBICOM, pp. 248–259.*

Boland, V., "Internet trading language launched," *Financial Times*, Jun. 10, 1999, p. 26.

Webpage: EON Corporation Profile, www.eon.com/core.htm, printed May 27, 1999.

(List continued on next page.)

*Primary Examiner*—Krisna Lim
(74) *Attorney, Agent, or Firm*—Kilpatrick Stockton LLP; George T. Marcou

(57) ABSTRACT

The present invention allows a customer to use any of a number of a plurality of devices to access data and make transactions using an institution's computers and databases from many different locations throughout the world. As an example, a banking customer may use either a telephone, a palm computer or a television to determine his checking account balance while vacationing in a foreign country. The present invention operates by connecting the customer to the desired computer and database using universal protocol so that location becomes irrelevant. Another feature of the present invention is the efficient use of different networks with varying transmission speeds.

8 Claims, 7 Drawing Sheets

U.S. PATENT DOCUMENTS

| | | | | |
|---|---|---|---|---|
| 5,594,952 A | | 1/1997 | Virtuoso et al. ............... 455/89 |
| 5,604,921 A | | 2/1997 | Alanara ....................... 455/45 |
| 5,617,343 A | | 4/1997 | Danielson et al. .......... 364/707 |
| 5,628,055 A | | 5/1997 | Stein ........................... 455/89 |
| 5,634,080 A | | 5/1997 | Kikinis et al. ............... 395/893 |
| 5,657,378 A | | 8/1997 | Haddock et al. ......... 379/93.23 |
| 5,675,524 A | | 10/1997 | Bernard ................. 364/705.05 |
| 5,679,939 A | | 10/1997 | Watanabe .................... 235/379 |
| 5,696,965 A | | 12/1997 | Dedrick ....................... 395/610 |
| 5,706,427 A | * | 1/1998 | Tabuki ....................... 713/201 |
| 5,710,884 A | | 1/1998 | Dedrick ................. 395/200.47 |
| 5,710,889 A | | 1/1998 | Clark et al. .................. 395/244 |
| 5,712,907 A | * | 1/1998 | Wegner et al. ......... 379/114.02 |
| 5,719,918 A | | 2/1998 | Serbetcioglu et al. ....... 379/58 |
| 5,736,728 A | | 4/1998 | Matsubara .................. 235/492 |
| 5,740,549 A | * | 4/1998 | Reilly et al. .................. 705/14 |
| 5,754,655 A | | 5/1998 | Hughes et al. ................ 380/24 |
| 5,757,917 A | * | 5/1998 | Rose et al. .................... 705/79 |
| 5,761,663 A | * | 6/1998 | Lagarde et al. ............... 707/10 |
| 5,806,000 A | | 9/1998 | Vo et al. ...................... 455/466 |
| 5,812,778 A | | 9/1998 | Peters et al. ........... 395/200.49 |
| 5,812,930 A | | 9/1998 | Zavrel ........................... 455/5 |
| 5,815,126 A | | 9/1998 | Fan et al. ....................... 345/8 |
| 5,815,506 A | | 9/1998 | Gokhale ...................... 370/524 |
| 5,822,310 A | | 10/1998 | Chennakeshu et al. ..... 370/317 |
| 5,825,408 A | | 10/1998 | Yuyama et al. ............... 348/14 |
| 5,828,655 A | | 10/1998 | Moura et al. ................ 370/236 |
| 5,850,358 A | | 12/1998 | Danielson et al. .......... 364/707 |
| 5,857,079 A | | 1/1999 | Claus et al. ................... 704/33 |
| 5,859,852 A | | 1/1999 | Moura et al. ................ 370/449 |
| 5,859,898 A | | 1/1999 | Checco .................... 379/88.01 |
| 5,867,795 A | | 2/1999 | Novis et al. ................. 455/566 |
| 5,878,397 A | | 3/1999 | Stille et al. .................. 704/466 |
| 5,884,271 A | | 3/1999 | Pitroda ......................... 705/1 |
| 5,890,140 A | | 3/1999 | Clark et al. ................... 705/35 |
| 5,894,554 A | * | 4/1999 | Lowery et al. ............. 709/203 |
| 5,903,881 A | | 5/1999 | Schrader et al. .............. 705/42 |
| 5,920,848 A | | 7/1999 | Schutzer et al. .............. 705/42 |
| 5,931,917 A | * | 8/1999 | Nguyen et al. ............. 709/250 |
| 5,933,816 A | | 8/1999 | Zeanah et al. ................ 705/35 |
| 5,974,146 A | * | 10/1999 | Randle et al. ................ 705/77 |
| 5,978,577 A | * | 11/1999 | Rierden et al. ............... 707/10 |
| 6,032,137 A | * | 2/2000 | Ballard ........................ 705/75 |
| 6,058,394 A | * | 5/2000 | Bakow et al. ................ 707/10 |
| 6,304,857 B1 | * | 10/2001 | Heindel et al. ............... 705/34 |
| 6,330,617 B1 | * | 12/2001 | Bamforth et al. ........... 709/246 |
| 6,546,488 B2 | * | 4/2003 | Dillon et al. ............. 713/181 |
| 6,625,646 B1 | * | 9/2003 | Kamanaka et al. ......... 709/224 |
| 6,658,483 B1 | * | 12/2003 | Iwamoto et al. ............ 709/246 |
| 6,711,624 B1 | * | 3/2004 | Narurkar et al. ............ 719/321 |

OTHER PUBLICATIONS

Webpage: The Nokia 9000il Communicator, www.nokia9000.com/main.html, printed May 27, 1 999.

Hills, A., "Terrestrial Wireless Networks," *Scientific American*, Apr. 1998, pp. 86–91.

Fancher, C.H., "Smart Cards," *Scientific American*, Aug. 1996, vol. 275, No. 2, pp. 40–45.

Day, R., "Pagers Get Smart—Two-way communication gives new intelligence to old technology," *Popular Mechanics*, Feb. 1999, pp. 57–59.

White, Christine, "On–Road, On–Time, and On–Line," *Byte*, Apr. 1995, vol. 20, No. 4, pp. 60–66.

(Internet article) Chevreau, J., "Financial sites in battle for Internet market share," *The Financial Post*, Nov. 20, 1997—http://paddle4.canoe.ca/Money/nov20_financials.html.

(Internet article) Anonymous, "New Partnership Brings Daily Rocket's Investment Monitor to Millions of Diamond Multimedia Customers," The Daily Rocket, Mar. 3, 1997—http://www.dailyrocket.com/press/pr3797.html.

The Washington Post Newspaper article, M. Cheek, A Syncing Feeling With the Rex Pro 5, Sep. 16, 1999, p. E6.

The Wall Street Journal, Yanks in Vogue: For France's Gemplus, The Secret of Success Is Made in the USA; It and Other Foreign Firms Adopt American Methods to Life Profit and Stocks; and Valley Talk as Lingua Franca, G. Pascal Zachary; Jun. 8, 1998.

European Search Report dated Oct. 9, 2000.

* cited by examiner

SYSTEMS AND METHODS FOR DISTRIBUTING INFORMATION TO A DIVERSE PLURALITY OF DEVICES

CONTINUING DATA

This application claims priority to U.S. provisional application No. 60/113,632 entitled "SYSTEMS AND METHODS FOR DISTRIBUTING INFORMATION TO A DIVERSE PLURALITY OF DEVICES" filed on Dec. 22, 1998, which is incorporated herein by reference.

FIELD OF THE INVENTION

This invention relates to servers, routers and access devices and methods that a customer uses to obtain information. The methods and systems described deliver this information to a plurality of diverse devices such that each device displays the correct information in a format commensurate with its own design.

BACKGROUND OF THE INVENTION

Customers use a plurality of devices to access data about themselves and receive information about goods and services offered by corporations, banks and organizations. For example, customers use telephones to call into a bank's system in order to determine their credit card balances and like information using a system as shown in FIG. 1.

Customer 1 uses his telephone 2 to call into the bank's system. He uses a specific phone number like a "1-800" number to get connected to the bank's system via the Public Switched Telephone Network (PSTN) 3. The PSTN completes a connection via interconnection path 10 between the customer's phone 2 and the bank's Computer Telephony Integration (CTI) server 4. The CTI server 4 holds some basic generic information and interfaces with the customer 1 via the PSTN 3 and phone 2. Examples of such information are greetings and menu options such as "Press 1 for account balance" etc.

If the customer 1 requests specific information to his own account, such as the balance, the CTI server 4 accesses a database (DB) server 5. The database server 5 retrieves information from the database 6 and provides it via interconnection path 11 to the CTI server 4 which then forwards it to the customer 1 via the PSTN 3 and telephone 2. Typically, the CTI server 4 performs a translation on the data it receives from the database server 5. This transformation is one from digital data to a computer generated voice. Thus, if the CTI server 4 receives the number "1,500" it will translate this into a computer generated voice message in the form of "Your balance is one-thousand five hundred dollars." This computer generated message is received and listened to by the customer 1 via the PSTN 3 and phone 2 which are designed to transmit and receive audio based data.

Should customer 1 desire to speak to a customer service representative 8, he merely makes the appropriate menu selection using his telephone 2 and the CTI server 4 switches him to the customer service representative 8 via telephone 9. The customer service representative 8 makes data requests to and receives data from database 6 via the database server 5 and a client/terminal 7. In this manner, the customer service representative 8 can obtain the customer's account balance directly from the database 6.

This system is efficient but it does suffer from several drawbacks. First, data is communicated to the customer 1 in an audio format. Thus if the customer wants to use a ard copy of the data, he must write down the information on a piece of paper as the CTI server 4 "speaks" to him.

Second, the use of the menu system can be quite cumbersome. Most menus are branching structures such that in order to find some information, the customer must make or 6 menu selections before obtaining the desired information. This is inefficient as the customer must listen to a plurality of computer generated prompts and make a number of selections via a keypad on the phone 2 (not shown) before receiving the desired information.

Another problem with the phone system described above is the inability to switch between a plurality of database server 5. For example, if the customer calls the phone number assigned to the credit card system, he will be unable to switch over to any other database 6 or CTI server 4 to receive information regarding student loans or home mortgages. Thus, in order to receive a wide variety of financial information, the customer 1 will have to make a plurality of phone calls to a plurality of different CTI servers 4.

Another problem with this system is in using the phone numbers themselves to access the system. This problem becomes more acute if the customer travels internationally. If the customer is in London, for example, and he desires to learn his credit card balance, he must dial the United States number associated with a particular CTI server 4 in order to get the credit card system. This requires him to know the number and the international calling codes. It may also require the customer to incur substantial expense in making an international call.

FIG. 2 shows another system customers use to obtain information. The system of FIG. 2 is an internet system where the customer uses his personal computer (PC) 20 to receive Web pages.

In this system, the customer 1 typically must use an Internet Service Provider (ISP) to obtain access to the Internet. One popular example of such an ISP is America Online. The ISP maintains servers and local networks 21 for acting as conduits to the Internet. The customer 1 pays either a flat fee or an hourly fee to use the ISP's equipment to obtain access to the Internet. The ISP provides the customer 1 with a phone number that the customer uses to dial into the ISP's equipment via the PSTN 3. Once the connection between the ISP equipment and the customer's PC 20 is established, the customer must type in the address of the company's or institution's Web pages and use a Web browser to retrieve that page through the Internet 22.

The company or institution maintains its Web pages on an Internet server 23. The Internet server 23 "builds" the Web pages the customer sees and forwards them to the customer's PC 20 via interconnection path 24, the Internet 22, the ISP equipment 21 and PSTN 3. When the customer requests specific information such as an account balance, the request gets routed via interconnection path 25 to the database server 5' and to the database 6 to provide the required data. The Internet server 23 retrieves the needed data from the database server 5' and places the appropriate graphics and colors around the data, formats all of this data and forwards it to the customer's PC 20 over the path described above.

This system is better than the phone system described above in that it provides data that is easily printable such that the customer does not have to write information down. Additionally, the customer may also receive data in parallel. For example, the customer can learn what his current credit card balance is and the payment address on the same screen. Thus, the customer does not have to listen to a series of messages to obtain all of the desired information.

The above system also suffers from some disadvantages. First, the relative speed in which data is transmitted to the PC 20 is relatively slow. This is because Web pages are designed for high resolution computer screens. There is therefore a lot of pixel data within each Web page. On top of this fact is the general design of the Internet. The Internet is based on a "thin client" type architecture. This means that the servers do most of the work in organizing Web pages such that the home PC does not need to work very hard in assembling the image data. It takes a fair amount of time for the bank's Internet server 23 to compile the data onto one such screen, format it for transmission and transmit it. The Internet, the ISP equipment and the PSTN 3 also have their transmission latencies in forwarding data which only adds to the delay created by the bank's Internet server 23.

Second, this method of forwarding data is also inefficient. Practically every Web page is comprised of both generic material as well as customer specific material. For example, the words "Account Balance" are generic to just about every screen viewed by every customer but the actual balance itself, say "$1,500," is specific to each customer. Thus, the bank's Internet server 23 is continually building and formatting the same data time after time during the course of the day. This is inefficient utilization of the bank's Internet server 23.

Third, typically the entire Web page is encrypted when transmitted. This again is inefficient utilization of the bank's Internet server 23. Nonproprietary information such as the words "Account Balance" are encrypted and decrypted when the only information that needs to be encrypted and decrypted is the actual dollar amount.

Another device customers use to access data and money is an Automatic Teller Machine ("ATM") or Customer Access Terminal ("CAT"). In these devices, customers insert magnetic cards or smart cards, type in a Personal Identification Number and access various banking services.

While ATMs have become more prevalent in today's society they additionally suffer from some drawbacks. The first is the customer must find an ATM in order to use it. Thus if the customer is in a remote area, it is likely that an ATM will not be nearby.

In addition, the ATM network is generally limited to financial services. In other words, the machines are use specific for financial information. Most ATMs are not equipped to handle shopping or purchasing of goods and services because the programming within the ATMs is limited and the network coupling the ATMs to bank computers is also limited.

SUMMARY OF THE INVENTION

The present invention solves the problems discussed above. In particular, the present invention provides global, universal access to various bank services, purchasing of goods and services and data.

Second, the methods and systems of the present invention also provide for much faster display times in that only portions of data are transmitted through a network. This saves time in both having a conventional server format the data and in transmitting that data over a network.

Third, the format the user receives his data in depends on the access device he is using rather than the actual server he accesses. In this manner, the user need only connect to the most convenient gateway access device to obtain the data he desires rather than cumbersomely obtaining a network path through various other services.

Fourth, the connection a customer makes with the desired server is based upon a unique customer identifier number. This allows a customer to use any of a plurality of devices in any of a plurality of locations around the world, and still be routed to the correct computer database to receive the desired information without having to know international calling numbers or incur significant costs.

These features and advantages, as well as others not specifically mentioned above, are apparent from the non-limiting detailed description of the embodiments of the present invention.

BRIEF DESCRIPTION OF THE DRAWINGS

The accompanying drawings, which are incorporated in and form part of the specification, illustrate preferred embodiments of the present invention and, together with the description, disclose the principles of the invention.

DETAILED DESCRIPTION OF THE DRAWINGS

Figure 1:
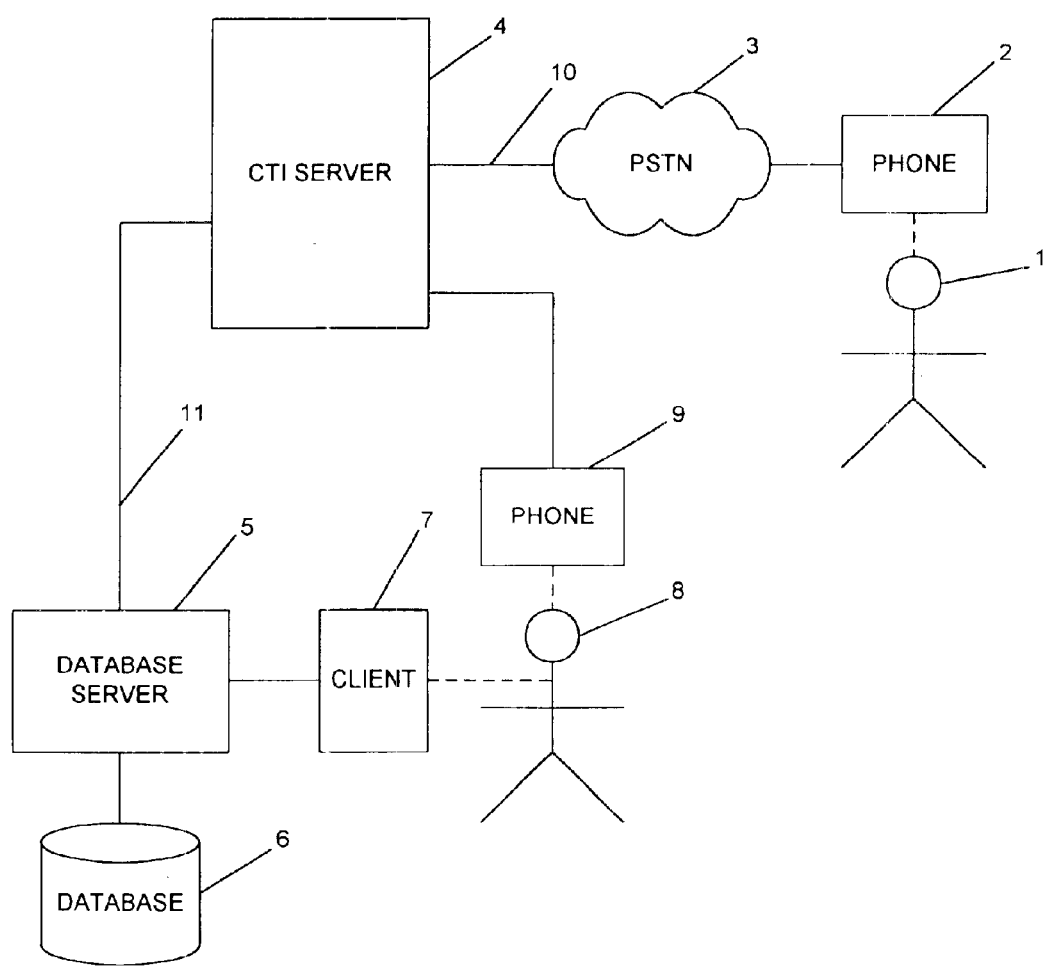
FIG. 1 is system overview of a conventional phone system.
Figure 2:
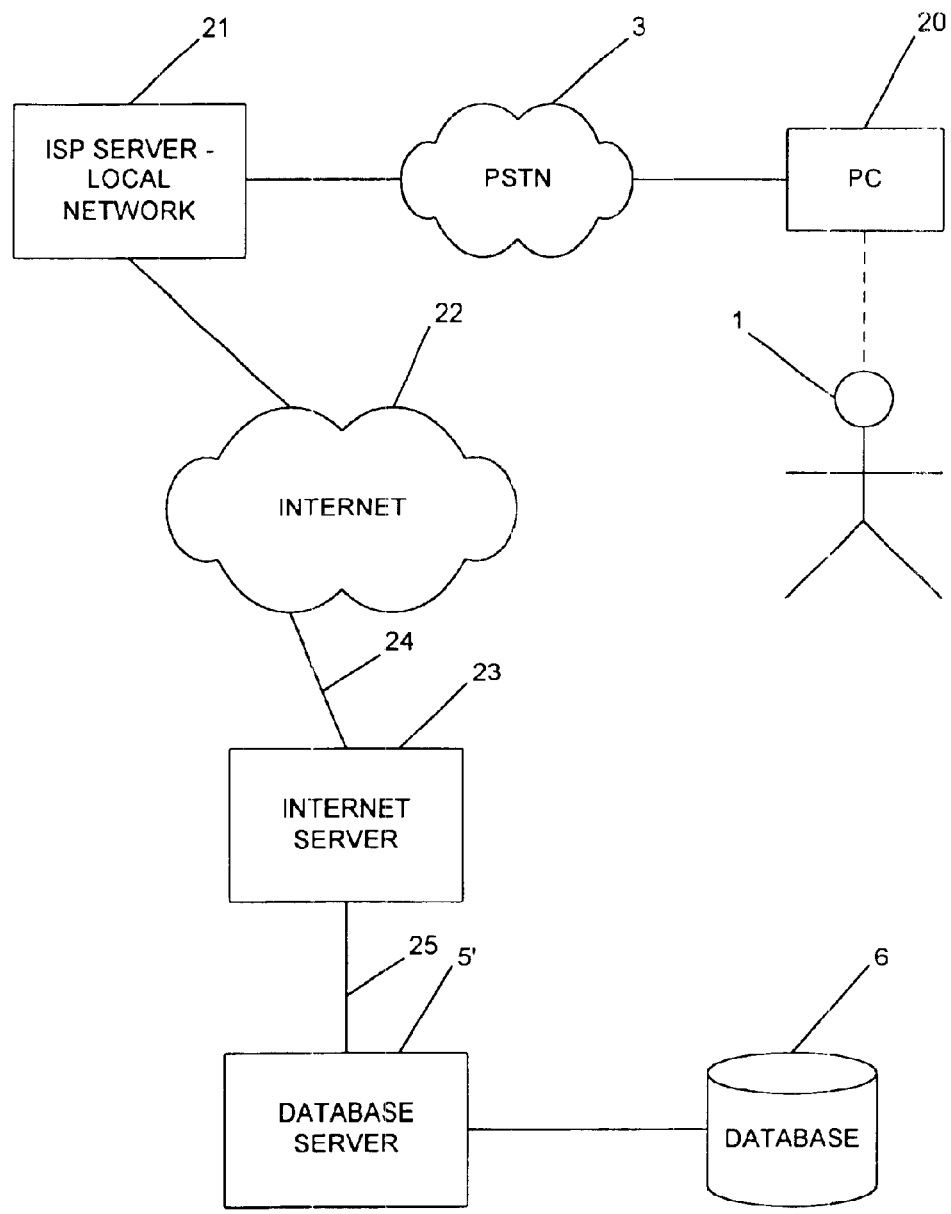
FIG. 2 is a system overview of a conventional Internet system.
Figure 3:
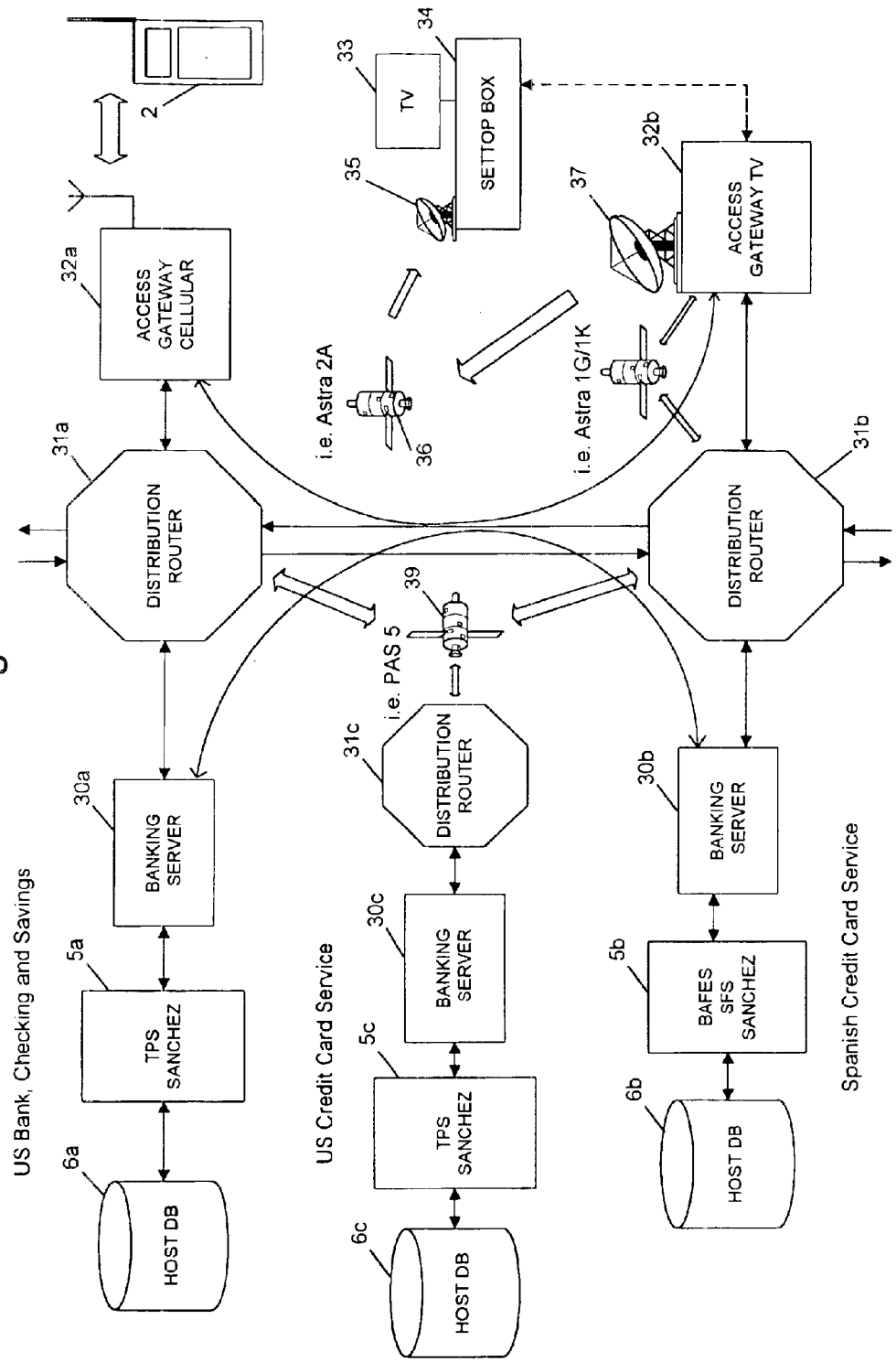
FIG. 3 is a system overview according to an embodiment of the present invention.

FIG. 3 is an overview of the system of a preferred embodiment of the present invention. Databases 6a, 6b and 6c hold data on a plurality of customers of one corporation or institution such as a bank. In FIG. 3, database 6a holds data associated with US customers of a particular service such as checking and savings accounts. Database 6b holds credit card data, but instead holds that data for Spanish customers. Database 6c holds data associated with US credit card customers. Database hosts 5a, 5b and 5c retrieve and forward data from and to databases 6a–6c, respectively. These hosts process the queries and format them so the databases store and retrieve data correctly. In addition, the hosts 5a–5c also format the data received from the databases 6a–6c so that the data returned from the databases 6a–6c the appropriate answer fits into fields. In other words, in response to a request for an account balance, the hosts 5a–5c put the actual dollar amount in the correct field so that the person requesting the account balance knows this number corresponds to the account balance. Hosts 5a–5c process simple queries such as retrieve the credit card balance for customer number 1234 5678 0123 45678. Hosts 5a–5c distinguish between the customer number and the request for the type of data desired in order to build the appropriate queries.

In a preferred embodiment, hosts 5a–5c operate using a standard Transaction Processing System ("TPS") that is human language independent. This allows hosts 5a–5c to share and swap data as will be described later. Alternative embodiments of hosts 5a–5c operate using Sanchez, SFS and BAFES.

Banking servers 30a–30c translate requests for data into instructions hosts 5a–5c understand. As will be described in more detail later, the banking servers 30a–30c receive messages and translate those messages into queries for specific pieces of data. In a preferred embodiment, the messages conform to the SSL standard. In addition, these servers sometimes provide additional text data along with the data received from hosts 5a–5c such that the data received from hosts 5a–5c is given context so that the user understands what he/she is viewing (i.e., "Our Payment Address is ____"). Servers 30a–30c operate using HSDS or NTDS in a preferred embodiment of the present invention.

Routers 31a–c route messages between each other, banking servers 30a–30c and Access Gateways 32a and 32b. These routers receive messages and simply route these messages to the correct destination. Part of the router connections include Ti lines, Internet connection, or LAN connections for interconnecting servers 30a–30c to access gateways 32a and 32b in preferred embodiments.

Access Gateways 32a and 32b formulate simple instructions for requesting data that is interpreted by banking servers 30a–30c. In addition, Access Gateways 32a and 32b take the data retrieved from the databases 6a–6c and format it such that the access devices 2 and 33 display it to the customer in logical manner.

An access device is any piece or pieces of hardware and software that may receive data inputs from a user, or that transmit and receive messages, and display or otherwise output data to the customer. One such access device is a mobile radiotelephone 2 such as a GSM phone. Some of these phones contain small Liquid Crystal Display (LCD) screens. The Access Gateway 32a takes the data it receives, bundles it into packets that are compatible with a format such as Short Message Service (SMS) or Wireless Access Protocol (WAP) and forwards it to the appropriate mobile radiotelephone network for transmission to mobile radiotelephone 2. It should be noted that a preferred embodiment of the present invention utilizes mobile radiotelephones, other telephones such as desktop screen phones that are coupled to the PSTN via land lines are also within the scope of the present invention.

The plurality of access devices also receive data in different data formats. For example, many telephones 2 receive and process ASCII data transmitted from access gateway 32.

Another access device is a combination television and set-top box 34. The set-top box 34 receives signals from a satellite dish 35 that receives signals from satellite 36. Satellite 36 receives signals from satellite 37 which is coupled to Access Gateway 32b. In this example, if the data received from databases 6a–6c is displayed on television monitor 33, the data is put into a screen template which provides graphics around the data to fill in the entire screen. This data is transmitted via satellite dish 37 to satellite 36 which forwards the screen data to satellite 35. The set-top box 34 decrypts, demodulates/decodes and forwards the data to television monitor 33 for viewing by the customer along with template data so as to form a comprehensive image as will be described later. In an alternative embodiment, the satellite link comprising satellites 35 and 36 is replaced with a direct cable connection or standard television broadcast methods.

From this overview, a few advantages of the present invention are readily apparent. First, due to the network paths between the routers 31a–31c, any user can get access to any database he/she desires using any access device he/she chooses. Second, a plurality of different databases can be accessed at one time during one communications session. Third, the formatting of data for the customer's particular access device is performed relatively late in the process (i.e., typically by access gateways 32a and 32b) such that data is not needless sent over a network. Fourth, the banking servers 30a–30c can be used by a plurality of access devices such as phones and computers instead of being designed to handle requests from a specific type of access device. Fifth, due to the universality of the overall architecture, an individual may request data using one access device (e.g., telephone) and have information pushed from one server (e.g., credit cards in the United States) to another customer using another access device (e.g., a television) or another server (e.g., checking account server in Spain). This relatively simple message transferring can be done by the first customer making the correct request and letting the architecture do the rest.

Beyond these advantages, the system shown in FIG. 3 is designed to take advantage of both current networking technology as well as older networking technology. As shown in FIG. 3, some of the various components are interconnected using satellites 36, 38 and 39. This is an example of a system taking advantage of the latest in both digital and analog satellite communication technologies. In addition, the components shown in FIG. 3 may also be interconnected using land lines, fiber optic lines, or mobile radiotelephone communications systems. Alternatively, the system shown in FIG. 3 may take advantage of a plurality of many types of such networking devices and technologies.

These advantages are obtained by the features of the system shown in FIG. 3. For example, the output data of servers 30a–30c are universal, such that access gateways 32a or 32b can interpret that output data and forward it to the access device desired in the proper format. Thus, a customer in Spain may retrieve requested data (i.e., account balance) on telephone 2 or television 33 via set-top box 34. The actual account balance data is stored in database 6b, where it is universalized by server 30b before it is specialized for delivery to the particular access device 2 or 33 via access gateway 32a or 32b.

By formatting this data late in the network path, much of the redundant or unnecessary data need not be transmitted through the network. This is especially true when using template data, as will be described later. For instance, only the data representing "1,500" is transmitted to set-top box 34 where it is combined with the template data "Your Account Balance Is" before displaying it on television 33.

The universality of the output data from server 30a and 30b also allows multiple accesses to multiple databases and reporting of the transaction to any of a plurality of devices. For example, a customer uses phone 2 to authorize an electronic transfer from his savings account in the United States to a family member in Spain. A customer uses telephone 2 to make the transaction. Server 30a outputs the dollar amount, destination account number received from the customer, and instructions indicating that the next server 30b is to accept this money as a deposit. This data is forwarded to banking server 30b via distribution routers 31a and 31b. Bank server 30b translates the instructions into deposit instructions that host computer 5b understands. Server 30b converts the amount to the desired local currency and forwards it for deposit into host computer 5b. After host computer 5b makes the deposit into database 6b, it triggers server 30b to inform the recipient. Server 30b builds a message informing the recipient of the money received, which is then forwarded and displayed on television 33 via set-top box 34 for the money recipient's viewing.

Figure 4:
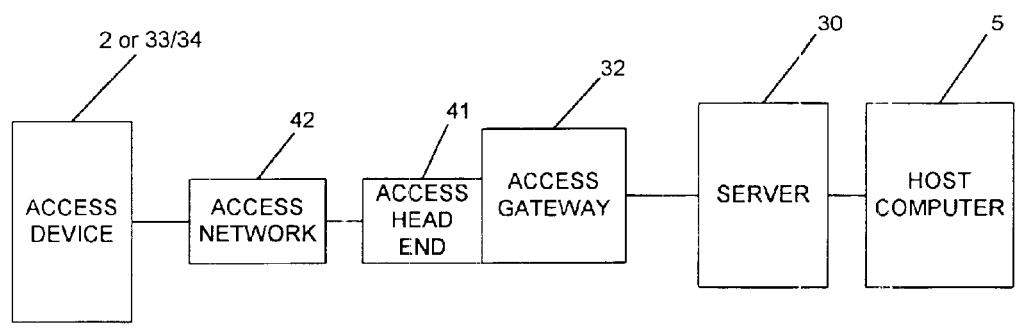
FIG. 4 is a system overview according to another embodiment of the present invention.

FIG. 4 is another view of an embodiment of the present invention. FIG. 4 shares similar reference numerals to FIG. 3. More specifically, host computer 5 in FIG. 4 correlates to host computers 5a–5c in FIG. 3; server 30 of FIG. 4 correlates to servers 30a–30c of FIG. 3; access gateway 32 of FIG. 4 correlates to access gateways 32a and 32b of FIG. 3; and access device(s) 2 or 33 and 34 of FIG. 4 correlate to access device(s) 2 or 33 and 34 of FIG. 3.

As noted before, host computer 5 manages customer specific information stored in databases (not shown in FIG. 4). Examples of such data include account balances, payment addresses and details of previous transactions. Server 30 acts as the translator between the access gateway 32 and the host computer 5. It extracts information from messages passed to it by the access gateway 32, reconfigures it into a format understandable by host computer 5 and forwards the reconfigured data as another message to host computer 5. In addition, server 32 also takes data passed to it by host computer 5 via a message, reconfigures it into a standard format that the access gateway 32 understands and forwards the message to access gateway 32. Access gateway 32 in turn takes the message received from server 30 adds appropriate addressing to the data and forwards it to access head end 41. In addition access gateway 32 also receives data from head end 41, extracts relevant data and reformats into a standard message format compatible with server 30.

Head end 41 places the data and messages received from access gateway 32 onto access network 42 and retrieves data from access network 42 for forwarding to access gateway 32. Access network 42 carries data to and from access device(s) 2 or 33 and 34 to access head end. Access device is typically a mobile telephone or a television/set-top box combination and displays data to the customer. In preferred embodiments, both devices receive data inputs from the user which we forwarded to the appropriate host computer 5 for building data queries. In an alternative embodiment, a telephone and television/set-top box 33 and 34 are used together such that the telephone accepts data from the user while the television and set-top box display the results for the user to view.

Figure 5:
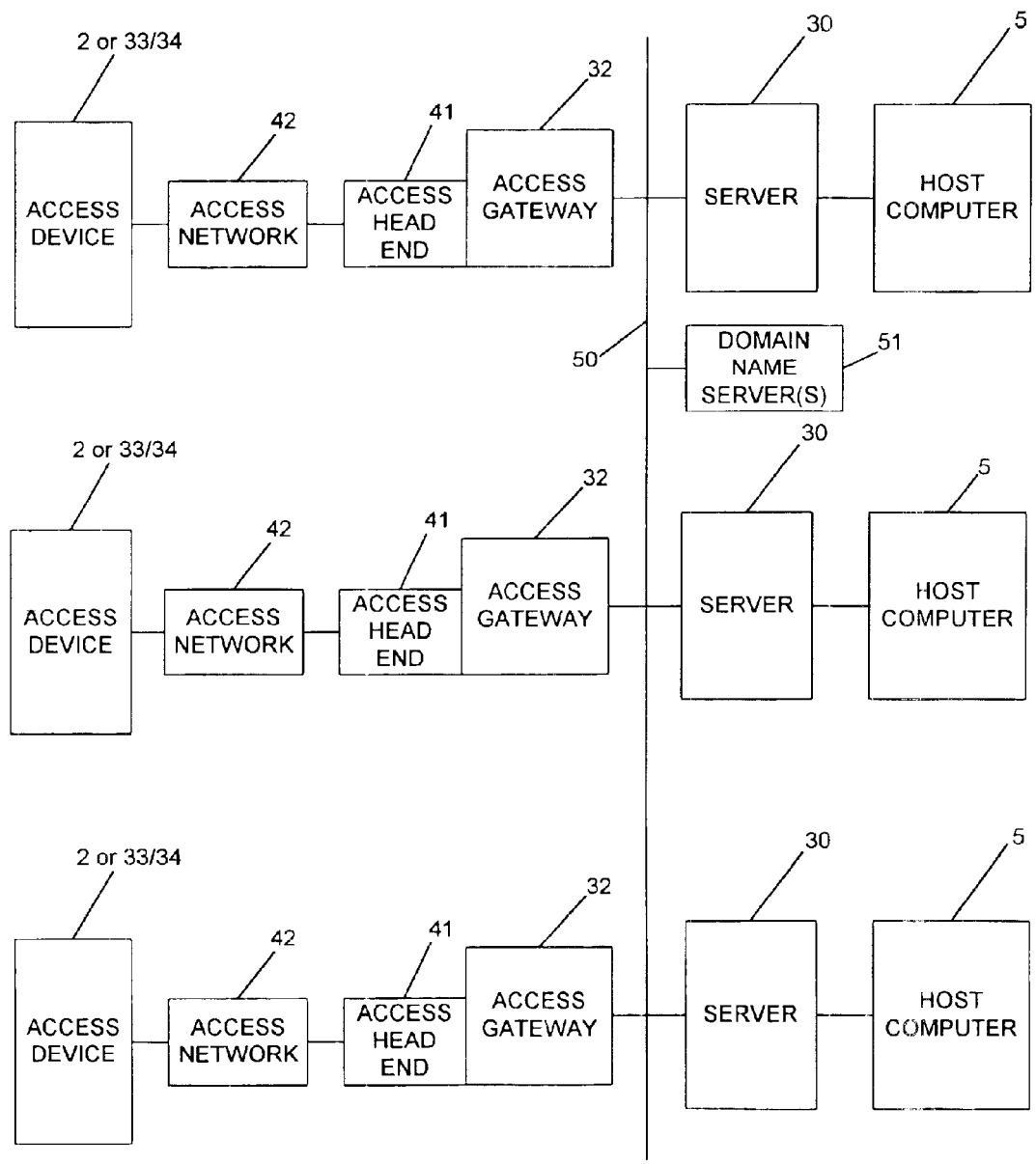
FIG. 5 is a system overview according to another embodiment of the present invention.

FIG. 5 is another view of an embodiment of the present invention. Many reference numbers used in FIG. 5 are used in FIG. 4. The additional features include network connection 50 and Domain Name Server ("DNS") 51. In a preferred embodiment, network 50 is an Internet Protocol ("IP") network that allows data, queries and instructions to be exchanged between servers 30. Referring back to the transfer of funds described above, the instructions between the United States servers 30a and 30b are transported on network 50. DNS 51 translates address to appropriate Universal Resources Locator ("URL") data.

FIG. 5 also shows another feature of the present invention. Network connection 50 comprises generally slower data transmission rates. Thus, servers 30 and access gateways 32 are kept to a minimum. Access gateways 32 however, generally have wider bandwidths and can provide the users with additional information such as "Your Account Balance Is" faster than the network connections between servers 30 and access gateways 32. Thus, by limiting the traffic between servers 30 and access gateways 32 to just the basic essential business transactional level, the overall speed of delivery is improved.

Figure 6:
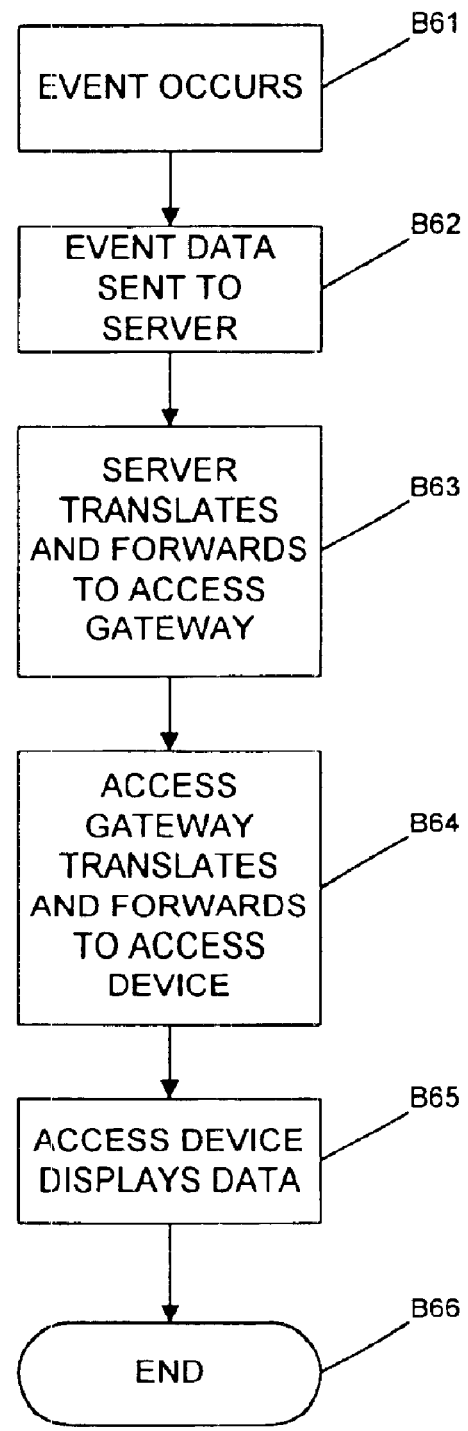
FIGS. 6 and 7 are flowcharts of processes in accordance with an embodiment of the present invention.

FIG. 6 is a flow chart for a process of obtaining data on an access device in accordance with an embodiment of the present invention. In this process data is pushed to the appropriate access device(s) 2 or 33 and 34. At block B61, an event occurs that triggers the pushing of data. Some common events include the closing of a securities market, a certain time of day or a warning. Examples of these common events include the closing of the New York Stock Exchange, sending headline news at 3:00 p.m. each day or the issuance of a tornado warning by the National Weather Service. Other events are more specific to certain individuals. For example, notice of a check clearing such that the funds are now available for use or the indication that a certain stock is valued at X dollars per share at a moment in time.

Whatever the event, a signal is sent from another server associated with the event at block B62. For example, a National Weather Service server transmits signals to the appropriate receiving servers regarding the tornado warning being issued.

At block B63, server 30 receives that signal and packages the appropriate message along with an address so that the message is routed to the correct access gateway 32. The address is a default established by the customer at initiation and is either stored in a database associated with the particular server 30 or the host database 5. As an example, if the customer has the data pushed to the screen on his/her telephone, the phone number or Mobile Identification Number is part of the address. Once properly encapsulated, the server 30 forwards the message to the appropriate access gateway 32.

At block B64, the access gateway 32 receives the message and adds appropriate addressing layers to it for transmission to the desired access device(s) 2 or 33 and 34. At block B65, the access device receives the message, decodes and/or decrypts it and displays it for the customer. At block B66, the process terminates.

The above embodiment describes pushing data to customers and subsequent termination of the communications channel. The pushed data is stored locally in the access device so that the user may read it later. While off-line, in an alternative embodiment, the communications channel is left open so that the user may respond to the pushed data. In addition, the messages may be broadcast to a plurality of customers or a single customer.

Figure 7:
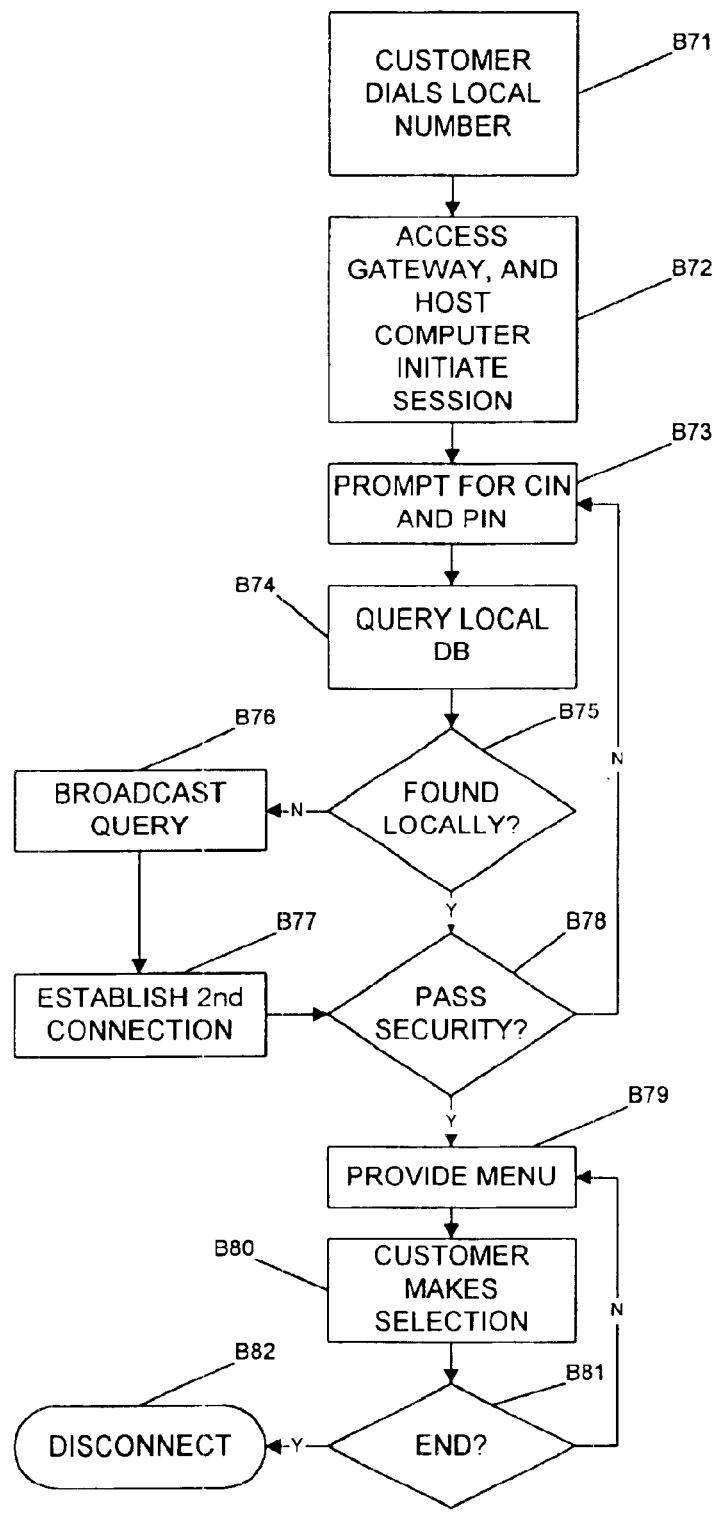

FIG. 7 is a flow chart of a process in accordance with another embodiment of the present invention. In this process, information is provided to the customer upon his/her request. At block B71, the customer uses access device 2 to dial a particular phone number associated with the type of data he/she wishes to receive. From one point of view, the customer is dialing into a particular server 30 that is associated with a particular access gateway 32. When using the television/set-top box combination as the access device, the customer usually presses a button located on set-top box 34 to begin the communications session with a particular server via the associated access gateway 32. It should be noted that this association is a default association (i.e. most phone calls received over a phone network in Spanish will be default routed to Spanish server 30b based on the presumption that the caller is highly likely to be a Spanish citizen seeking information in Spanish.)

Whichever access device is used, a communications channel between access device(s) 2 or 33 and 34, and host 5 is established at block B72. This is accomplished when the appropriate access network 42 and head end 41 recognize the request to open a communications channel and open such a channel between the access device(s) 2 or 33 and 34, and the access gateway 32. The access gateway 32 in turn initiates a communications session with server 30 and server 30 in turn opens and maintains a communications session with host computer 5 that is associated with access gateway 32 by default.

At block B73 host computer 5 issues a message requesting a customer or account identification number ("CIN") and a personal identification number ("PIN"). These messages are converted into comprehensible language phrases such as "Please enter your Customer Identification Number" and "Please enter your Personal Identification Number" in English) by server 30 and forwarded to access gateway 32 via router 50, which encompasses router 31a–31c. The messages are packaged and the forwarded to access device (s) 2 or 33 and 34.

Also in block B73, the user replies by either actuating buttons, such as a touch-tone keypad on telephone 2 or set-top box 34, or by having portions or all of that data automatically forwarded to host computer 5 from a memory associated with telephone 2 or set-top box 34. This memory may be permanent to the telephone 2 or set-top box 34 in one embodiment or it may be removable, such as a smart card or magnetic memory, in another embodiment.

Once host computer 5 has the user's CIN and PIN, it performs a query to determine if that user has the required data stored therein at block B74. At block B75, the results of the query are returned to server 30 where it determines if the customer's data is stored with host computer 5. If the customer is not associated with host computer 5, server 30 issues a query at block B76 to other servers via network 50 to determine where this customer's information is located (i.e. which host computer 5 houses that data). When the appropriate host computer 5 is discovered, the server 30 redirects access gateway 32 to the appropriate server 30 at block B77.

Alternatively, if the host computer 5 first queried contains the desired data, a security check is performed to determine if the received PIN is associated with received CIN at block B78. If the data fails the security, the process returns to block B73 where the customer is prompted again to enter the appropriate data. If the CIN and PIN are correct, host computer 5 provides data related to a menu that lists its services at block B79. For banking services, typical menu selections include checking account balances and making a transaction. For shopping services, the menu may include departments of items, payment options, etc. Once the customer makes a selection at block B80, the request for data is transmitted from the access device(s) 2 or 33 and 34 to host computer 5. In response, host computer 5 transmits the requested data back to access device(s) 2 or 33 and 34.

At block B81, the customer or the system determines if the customer requires more data. If he/she does, the process returns to block B79. If the customer is finished, the communication channel is broken and the process ends.

In order to explain the process described in FIG. 7, a specific non-limiting example using a single individual will be described in conjunction with FIG. 3. A United States customer of a particular bank is planning a trip to Europe. Before embarking, he/she uses telephone 2 to check his/her checking account balance with the bank. By initiating the communications session with access gateway 32a, his/her connection is established via router 31a directly to server 30a. Thus, server 30a is associated with access gateway 32a by default. Server 30a establishes a communications session with host 5a.

Host computer 5a prompts the customer for his/her CIN and PIN. Server 5a translates these messages into voice phrases such as "Please enter your Customer Identification Number" and "Please enter your Personal Identification Number." In addition, server 30a adds addressing data so that the prompts are routed to the particular telephone 2 the customer is using via router 31a and access gateway 32a.

After reviewing his/her balance, the customer disconnects and dials a different number to determine his/her credit card balance. Access gateway 32a establishes a connection with the bank account host 5a and in response host 5a prompts the customer for his/her customer identification number and personal identification number as noted above. The customer enters his or her credit card number and this is forwarded to host server 5a. Host server 5a determines that these customer and personal identification numbers are not stored in database 6a. Host server 5a informs server 30a that the customer entered data does not correlate with any data stored in database 6a. Server 30a broadcasts a query looking for the appropriate database that stores the data related to the customer entered data. Routers 31a and 31c route the query to server 30c. Host 5c and database 6c recognize the customer data, verify it for correctness (i.e. is the PIN correct for the CIN) and inform server 30a that the customer should be interfacing with it instead of server 30a. Server 30a incorporates the address of server 30c into an instruction and forwards the instruction to access gateway 32a.

Upon receipt of the instruction, access gateway 32a associates all data coming from and directed to the customer to server 30c. Host 5c outputs the credit card balance to server 30c which then forwards it to the telephone 2 via access gateway 32a and routers 31a and 31c.

So far, this customer has dialed only one telephone number, albeit two times, to receive distinctly different data located in two distinctly different databases. The customer has no idea how the various elements interacted to provide that requested data.

A week later, the customer is staying with relatives in Spain and he/she wishes to account for his or her vacation expenses to date. The relatives have a set-top box 34 coupled to their television 33. The customer dials into the system using the set-top box 34 and a connection is established with access gateway 32b as that is the device that supports set-top box 34. Access gateway 32b establishes a connection with server 30b via router 31b. Server 30b establishes a communications session with host computer 5b. Host computer 5b transmits data requesting the customer to enter his/her CIN and PIN. This data is routed to access gateway 32b via router 31b and subsequently to set-top box 34 and television 33. The access gateway takes the data received from server 30b and router 31b and formats it for the screen of television. Set-top box 34 demodulates/decodes the data, and forwards it to television 33 where it is displayed.

The United States customer is now viewing a screen with two questions on it. The first is "Por favor entre su numero de la taijeta que quienes usar para ente servicio," which roughly translates to "Please enter your number associated with the service you desire to use." The second question is "Por favor marke su numero personal que lo identifica a usted," which roughly translates to "Please mark, or type, in your personal identification number." The United States customer will not know what the two questions are asking for, but will know that this system only asks two questions where the first requests his/her CIN and the second requests his/her PIN. The customer enters his/her CIN associated with the desired credit card service supported by equipment in the United States. In this preferred embodiment, all host computers 5 and server 30 are programmed to begin a session with these two questions and all users of the system anticipate receiving these two questions at the beginning. It is therefore unnecessary for the user to translate the language before entering the data.

The CIN and PIN are routed to server 30b which forwards them to computer 5b for verification against the data stored in database 6b. Host 5b returns messages indicating that the CIN does not correlate to data stored in database 6b. Server 30b issues a query that includes the CIN and PIN across an internal network 50 in FIG. 5, so as to locate the host computer and database that correlate to the entered CIN and PIN.

Server 30c receives the broadcast message and forwards the CIN and PIN to host computer 5c. Host 5c forwards a query to database 6c to determine if that database stores data related to the CIN and PIN. Host 5c returns an affirmative response that server 30c uses to issue an instruction to access gateway device 32b to forward all data from the customer to it instead of server 30b. Access gateway responds by establishing this routing pattern through routers 31b and 31c This second part of the example shows how the customer may establish an inexpensive or low cost connection with the server he/she desires. The connection between the set-top box 34 and access gateway 32b is a local connection and presumably free or at least less expensive than if the customer had to use a telephone to dial into the United States to obtain access to the desired data.

Another feature is the ease of translation. Server 30b is designed to provide phrases in Spanish. After the initial prompting for the customer's CIN and PIN, the customer is connected to server 30c for receiving English based prompts and presentations of data (i.e. it will provide the phrases "Your account balance is _____."). Thus, the customer is able to retrieve and utilize the requested data in the preferred language.

Another advantage is the universality with which servers 30a–30c interface with different access gateways and thereby different access devices. The servers 30a–30c provide the data such as account balances and the phrases such as "Your account balance is" to the access gateway devices which then format the data to fit a screen on a mobile telephone, a hand held computer, a personal digital assistant or television screen.

The process shown in FIG. 7 is adaptable to many user modes of operation. In addition to the conversational mode where the user requests data via telephone 2 or television/set-top box combination 33/34, and receives responses continuously as shown by the loop of blocks B79–B81 of FIG. 7, the present invention also operates so that the user receives information all at once.

An example of this all in one mode includes a default function. The user may own a specific pager or set-top box device that only retrieves current account balances for a selected account. Such a pager or set-top box has a toggle switch from which the user selects whether he/she wishes to receive the balance of a checking account, a savings account or a credit card account. In other embodiments, the device is programmable such that it defaults to requesting specific information. Thus, upon initial set-up or later during a reprogramming phase initiated by the user, the user establishes the default to be the retrieval of a specific account balance. This data is typically stored in ROM within the telephone 2 or the set-top box 34. In yet another embodiment, the default request may be made by inserting a removable ROM, such as a smart card, into the telephone 2 or set-top box 34. After the requested data is forwarded to the user, the communication channel is disconnected.

In another embodiment of all in one retrieval, the user selects an option from a menu provided and after the user receives the requested information, the session ends. This operational mode differs from the above default mode in that the user is given a menu of options to chose from dynamically instead of defaulting to one type of data retrieval. In addition, this method again differs from the continuous loop of blocks B79–B81 of FIG. 7 in that as soon as the data is delivered, the communications channel is terminated. As a point of reference, this process is much like a DOS™/UNIX™ command line prompt. After the user makes his/her request for data, the access device waits for the next instruction.

In yet another embodiment of the all in one mode of receiving data, the user requests data fit for a template or a form. The basic information is provided such as the number of the account and the account balance number. The phrases such as "Account Number" and "Account Balance" are stored in a template locally to the telephone 2 or the set-top box 34. The user gets a view of the template without the user specific data and decides that this is the data that he/she desires to view. Data identifying to that template is sent to server 30, where it translates that data into queries that computer host 50 understands. The server 30 returns the requested data and the access device(s) 2 or 33 and 34 merges the locally stored template or form data with the received data to form a composite screen that is understandable by the user. An example of the use of such a set-top box is described in co-pending U.S. utility application Ser. No. 09/433,867 and corresponding U.S. provisional application 60/107,488, 60/109,937 and 60/111,264 entitled "SYSTEMS AND METHODS FOR INTEGRATING VIDEO, AUDIO AND MOBILE RADIOTELEPHONE TECHNOLOGY" filed on Nov. 6, 1999, Nov. 6, 1998, Nov. 25, 1998 and Dec. 7, 1998, respectively, which are incorporated herein by reference.

One advantage of the template/forms application is the ability for the user to enter data into the blank template/form while the access device is off-line. In this manner, the user may carefully consider what information he/she wishes to review before establishing a connection with any other device and potentially incurring costs. As an example, some templates/forms include "Paying a Bill" or "Making a Transfer."

While the above has been described using specific examples, it is apparent to those of ordinary skill that alternative embodiments are possible without departing from the scope of the present invention.

It should be noted that alternative methods include contacting servers outside of a proprietary circle via the IP network. For example, if a customer of bank A accesses server 30 associated with bank B, bank server B will forward that request to bank server A so that the customer may obtain his/her data even though the customer is not a customer of bank B.

In another alternative embodiment, the messages transmitted between the server 30, access gateway 32 and access device(s) 2 or 33 and 34 is encrypted to improve security. In another alternative embodiment, the data transmission between the access gateway and the access device are not encrypted, while the message exchange between the servers and access gateways are encrypted.

In addition to the services and transactions provided above, it should be obvious to one of ordinary skill to implement other services and transactions on the claimed system without departing from the scope of the present invention. For example, bill payments, fund transfers, adding a payee, real message transfer between customers, stop payment, and buy and sell shares of stock.

As a corollary, more complex functions may be provided for in the future. For example, server 30 may be programmed to run a spreadsheet application across a user's expanses. The results are then transferred to telephone 2 where it is graphically displayed like in a pie chart.

It should also be understood by those of ordinary skill that wile the present invention is capable of providing information in acceptable formats for non-Web or non-HTML compatible devices, it is also possible to merge Web-based and Internet-based applications on server 30. Thus, a user may use his/her phone or set-top box/television combination to receive e-mail, Web pages, voice mail and information in accordance with the above embodiments.

Finally, it should also be noted that the present invention may be implemented using the OSI standard or a combination of OSI and TCP/IP.

What is claimed is:

1. A method of operating a messaging system comprising:

receiving data in a first format from a first access device into a first access gateway:

converting the data in the first format into a second format;

forwarding the data in the second format from the first access gateway to a first server;

converting a portion of the data in the second format into an information query;

forwarding the information query from the first server to a database host;

formatting the information query at the database host for recognition by at least one database; and forwarding the formatted information query to the at least one database.

2. The method of claim 1 wherein the access device is selected from the group consisting of a mobile phone and a television.

3. The method of claim 1 wherein the first format is selected from the group consisting of short message service (SMS), wireless access protocol (WAP) and American Standard Code for Information Interchange (ASCII).

4. The method according to claim 1, further comprising:

retrieving an answer to the formatted information query from the at least one database;

forwarding the answer to the formatted information query from the database host to a second server;

converting the answer to the formatted information query into a third format;

forwarding the answer to the formatted information query in the third format to a second access gateway;

formatting the answer to the formatted information query in the third format into a fourth format; and forwarding the answer to the formatted information query in the fourth format to a second access device.

5. The method according to claim 4, wherein the first format and the fourth format are the same format.

6. The method according to claim 4, wherein the first format and the fourth format are different formats.

7. The method according to claim 4, wherein the first access device and the second access device are the same device.

8. The method according to claim 4, wherein the first access device and the second access device are different devices.

* * * * *